(12) United States Patent
Bowen et al.

(10) Patent No.: US 8,746,098 B2
(45) Date of Patent: Jun. 10, 2014

(54) GEAR SHIFTING ACTUATOR AND METHOD OF SHIFTING GEAR RATIOS

(71) Applicant: Hyundai Wia Corporation, Changwon-shi (KR)

(72) Inventors: Thomas Bowen, Rochester Hills, MI (US); Nam Huh, Commerce Township, MI (US)

(73) Assignee: Hyundai Wia Corporation (KR)

( * ) Notice: Subject to any disclaimer, the term of this patent is extended or adjusted under 35 U.S.C. 154(b) by 0 days.

(21) Appl. No.: 13/887,622

(22) Filed: May 6, 2013

(65) Prior Publication Data
US 2013/0239717 A1 Sep. 19, 2013

Related U.S. Application Data

(62) Division of application No. 12/761,163, filed on Apr. 15, 2010, now Pat. No. 8,505,403.

(51) Int. Cl.
*F16H 61/32* (2006.01)

(52) U.S. Cl.
USPC ........... 74/330; 74/335; 74/473.1; 74/473.12; 74/473.37

(58) Field of Classification Search
USPC .............. 74/330, 335, 473.1, 473.12, 473.24, 74/473.37
See application file for complete search history.

(56) References Cited

U.S. PATENT DOCUMENTS

| 2,157,592 A * | 5/1939 | Casler | 74/335 |
| 6,990,872 B2 * | 1/2006 | Chen | 74/335 |
| 2006/0201269 A1 * | 9/2006 | Maillard et al. | 74/340 |

FOREIGN PATENT DOCUMENTS

FR 2 873 776 * 2/2006

* cited by examiner

*Primary Examiner* — William C Joyce
(74) *Attorney, Agent, or Firm* — Park & Associates IP Law, P.C.

(57) ABSTRACT

A gear shifting device for shifting gears of a transmission includes: at least one guide rail each extending in a longitudinal axis; a plurality of shift effecting members configured to move a plurality of corresponding sliding sleeves coupled to the guide rail for shifting gears, the shift effecting members each having a terminal end portion with a finger receiving opening formed therein, the finger receiving opening extending in a direction generally parallel to the longitudinal axis of the guide rail; and a shift shaft extending in a direction generally parallel to the longitudinal axis of the guide rail, the shift shaft having a shift finger coupled thereto. The shift shaft is rotatable to pivotally position the shift finger at locations aligned with the finger receiving openings of the shift effecting members, and is also displaceable in the longitudinal direction in the finger receiving openings to move the shift effecting members to effect a gear shifting operation.

5 Claims, 20 Drawing Sheets

GEAR SHIFTING ACTUATOR AND METHOD OF SHIFTING GEAR RATIOS

REFERENCE TO RELATED APPLICATIONS

This is a divisional of U.S. patent application Ser. No. 12/761,163 filed on Apr. 15, 2010, now U.S. Pat. No. 8,505,403, the entire contents of which are incorporated herein by reference.

FIELD OF THE INVENTION

The present invention relates to a shifting apparatus and method for shifting gear ratios in a transmission, and more particularly, to a gear shifting actuator and a method for shifting gear ratios for a dual clutch transmission of a vehicle.

BACKGROUND OF THE INVENTION

A dual clutch transmission of a vehicle typically utilizes two manual shift transmissions in a single housing to drive the wheels of a vehicle with different gear ratios or stages. A conventional dual clutch transmission generally contains two independent clutches that are normally open or released, and further includes at least one input shaft, and at least one output shaft operably coupled with each other. Each of the two clutches is coupled to its corresponding input shaft to drive an output shaft with selected gear ratios.

In order to perform the gear shifting process, the dual clutch transmission further includes a gear shift actuating device which is driven by an actuator such as an electric motor. According to the dual clutch transmission systems known in the art, the gear shifting devices typically include a drive shaft, a shift finger for the gear engaging operation, and elements designed particularly for disengaging operations of the gears. For example, as illustrated in FIGS. 3a and 3b, a conventional gear shifting device for double-clutch transmissions known in the art uses shift frames 301, 302, 303, and 304 to move corresponding shift members to engage with the gears assigned thereto, and further includes a drive shaft 315 (only a portion shown in FIG. 3a) with a shift finger 316 and a plurality of disengagement cams 316a formed on the drive shaft 315 for the engagement and disengagement operation of the gears, respectively. As shown in FIGS. 3a and 3b, each shift frame (301, 302, 303, and 304) includes inner cam groove 306 of complex contour combined with a generally rectangular cam groove and two opposing circular cam grooves formed at two opposite sides of the rectangular groove. As shown in FIG. 3c, which is a sectional view taken along the line A-A in FIG. 3b, the cam groove 306 of each of the shift frames 301-304 has the same width 331a, the shift finger 316 has a width 332a between two opposite sides (shift finger contact sides), which width is smaller than width 331a of the shift frame.

In order to shift and engage a selected gear, the drive shaft 315 is first axially displaced so as to align the shift finger 316 with the shift frame 301-304 (for example, shift frame 304 as shown in FIG. 3c) of the target gear. The drive shaft 315 is then rotated by actuator, and the shift finger 316 pushes the selected shift frame by rotational cam contact of the shift finger 316 against the two opposite rectangular sides of cam groove 306 of the selected shift frame, and as a consequence, the selected shift frame (e.g., shift frame 304) for the target gear moves in lateral direction to predetermined distance, namely, either distance 332b to set one gear ratio or distance 332c to set a different gear ratio according to the design of the transmission. On the other hand, in order to release or disengage one or more non-target gears, the drive shaft 315 is again axially moved until the shift finger 316 is aligned with the shift frame (301, 302, 303, or 304) for the gear to be released, and one of the multiple disengagement cams 316a of the drive shaft 315 rotates to a releasing direction and pushes the cam groove 306 of the shift frame upon rotation of the drive shaft 315, and the shift frame for the gear to be released moves in lateral direction by a predetermined distance to release the releasing gear.

As described above, this conventional gear shifting device requires complex cam parts to be manufactured with precision, such as shift frames 301-304 with complex cam grooves produced in high precision and accuracy, shift finger 316 with precise cam contour, and multiple disengagement cams 316a with precise cam contour. Thus, this shifting device requires a complex production process and a high manufacturing cost.

Moreover, as shown in FIG. 3a, the drive shaft 315 (only a portion shown in FIG. 3a) extends in a direction perpendicular to the shift frames 301-304, and as a consequence, also perpendicular to the direction of the fork guide rails as well. An actuator (not shown) is positioned at a distal end of the drive shaft 315, and coupled thereto to drive the drive shaft for the gear shifting operation. Due to this perpendicular arrangement of the drive shaft 315 relative to the fork guide rails, the shifting device requires a relatively large volume, and it is generally difficult to reduce the size of the resultant transmission containing the shifting device.

In another example, U.S. Pat. No. 7,353,726 (assigned to ZF Friedrichshafen AG.) suggests a shifting device which has a structure generally similar to that described above with FIGS. 3a-3c. Similar to the above-described design, this gear shifting device also includes four gearshift frames of rectangular shape with cam grooves or recesses formed therein, multiple sets of sliding selector shafts affixed to the gearshift frames, and a shift drive shaft which extends in a direction perpendicular to the sliding selector shafts and with a plurality of shift fingers coupled thereto for engaging and disengaging operation of the gears. See FIG. 4 of U.S. Pat. No. 7,353,726.

As describes, this shifting device also requires complex cam parts to be precisely manufactured, such as four gearshift frames with cam grooves to be produced with high precision and accuracy, multiple shift fingers with precise cam contours. Thus, this shifting device also requires a complex production process and a high manufacturing cost. Moreover, as the shift drive shaft extends in a direction perpendicular to the sliding selector shafts, and also perpendicular to the direction of the fork guide rails as well. Accordingly, due to this perpendicular arrangement of the shift drive shaft relative to the fork guide rails, this shifting device also requires a relatively large volume, and it is generally difficult to reduce the size of the shifting device, and thus, the overall transmission as well.

SUMMARY OF THE INVENTION

In order to solve the above described drawbacks and other problems of the conventional gear shifting device, the present invention provides a new and useful gear shifting device and methods for shifting gear ratios for a dual clutch transmission.

The present invention also provides a useful gear shifting device that can be provided with relatively low cost in comparison to the conventional gear shifting devices, and methods for shifting gears (i.e., gear ratios) preferably for a dual clutch transmission using or generally in association with the gear shifting device of the invention.

Moreover, contrary to the afore-mentioned conventional shifting devices having a perpendicular arrangement relative to the fork guide rails, the shifting mechanism of the present invention is placed in parallel relation with the direction of the fork guide rails. Thus, the shifting device of the invention can simplify the design, reduce the length of the very long shift forks of the conventional design, and also reduce the vertical height and volume of the resultant transmission package.

According to one aspect of the invention, the gear shifting device comprises:

at least one guide rail each extending in a longitudinal axis thereof;

a plurality of shift effecting members (for example, such as shift forks or the like) configured to move a plurality of corresponding sliding sleeves coupled to the guide rail for shifting gears upon actuation of a shift actuator, the shift effecting members each having a terminal end portion with a finger receiving opening formed therein, the finger receiving opening extending in a direction generally parallel to the longitudinal axis of the guide rail; and a shift shaft extending in a direction generally parallel to the longitudinal axis of the guide rail, the shift shaft having a shift finger coupled thereto;

wherein the shift shaft is rotatable to pivotally position the shift finger at locations aligned with the finger receiving openings of the shift effecting members, and is also displaceable in the longitudinal direction in the finger receiving openings to move the shift effecting members to effect a gear shifting operation.

In one preferred embodiment, the gear shifting device is configured to couple with a dual clutch transmission containing two clutches, one for driving the odd numbered gears and the other clutch for the even numbered gears. The finger receiving openings of the shift effecting members have, preferably, a generally rectangular shape, in which the finger receiving openings of the two inner terminal end portions have an opening width which is larger than that of the finger receiving openings of the two outer terminal end portions.

According to another aspect of the invention, the method of shifting gears with a gear shifting device comprises:

providing a gear shifting device, which includes: at least one guide rail each extending in a longitudinal axis thereof; a plurality of shift effecting members (for example, such as shift forks or the like) for shifting gears, the shift effecting members each having a terminal end portion with a finger receiving opening formed therein; and a shift shaft extending in a direction generally parallel to the longitudinal axis of the guide rail, the shift shaft having a shift finger coupled thereto;

rotating the shift shaft and pivotally positioning the shift finger at a location aligned to receive in the finger receiving opening of a selected one among the shift effecting members; and displacing the shift shaft in the longitudinal direction and moving the selected shift effecting member to effect a gear shifting operation.

In one preferred embodiment, said rotation of the shift shaft is actuated by a first electric motor, and said longitudinal displacement of the shift shaft is actuated by a second electric motor. The gear shifting operation is performed preferably via at least one sliding sleeve each coupled to the guide rail and the shift effecting members, and the gear shifting device is coupled preferably with a dual clutch transmission containing two clutches.

BRIEF DESCRIPTION OF THE DRAWINGS

The above described and other objects, features and advantages of the present invention will be more apparent from the presently preferred embodiments of the invention disclosed in the following description and illustrated in the accompanying drawings, in which:

FIG. 3b is a top view of the conventional gear shifting device of FIG. 3a;

FIG. 4b is a left side view of the gear shifting device of the present invention of FIG. 4a;

FIG. 10 illustrates one example of the operation of the invention showing a stage with the fourth gear engaged to drive the vehicle with the fourth gear, in which FIGS. 10(a) and 10(b) are sectional views similar to FIGS. 4(c) and 4(b), respectively, and illustrating the position of shift finger received in the opening of the shift fork for the second and fourth gears, and FIG. 10(c) is a partial sectional view illustrating the corresponding positioning of the sleeves with the fourth gear engaged;

FIG. 11 illustrates a successive stage from FIG. 10 with the fourth gear still engaged and the fifth gear preselected, in which FIGS. 11(a) and 11(b) are sectional views similar to FIGS. 4(c) and 4(b), respectively, and illustrating the position of shift finger moved to engage with the fifth pre-selected gear, and FIG. 11(c) is a partial sectional view illustrating the corresponding positioning of the sleeves (with the fourth gear still engaged and the fifth gear pre-selected);

FIG. 12 illustrates a successive stage from FIG. 11 with the fifth gear engaged and the fourth gear disengaged, in which FIGS. 12(a) and 12(b) are sectional views similar to FIGS. 4(c) and 4(b), respectively, and illustrating the position of shift finger moved to disengage the fourth gear, and FIG. 12(c) is a partial sectional view illustrating the corresponding positioning of the sleeves (with the fourth gear disengaged and the fifth gear still engaged);

FIG. 13 illustrates a stage in which the vehicle is driven with the fifth gear engaged, in which FIGS. 13(a) and 13(b) are sectional views similar to FIGS. 4(c) and 4(b), respectively, and illustrating the position of shift finger in stationary position, and FIG. 13(c) is a partial sectional view illustrating the corresponding positioning of the sleeves (with the fifth gear still engaged);

FIG. 14 illustrates a successive stage from FIG. 13 with the fifth gear still engaged and the fourth gear pre-selected, in which FIGS. 14(a) and 14(b) are sectional views similar to FIGS. 4(c) and 4(b), respectively, and illustrating the position of shift finger moved to pre-select the fourth gear, and FIG. 14(c) is a partial sectional view illustrating the corresponding positioning of the sleeves (with the fourth gear pre-selected and the fifth gear still engaged); and FIG. 15 illustrates a successive stage from FIG. 14 with the fifth gear disengaged and the fourth gear engaged, in which FIGS. 15(a) and 15(b) are sectional views similar to FIGS. 4(c) and 4(b), respectively, and illustrating the position of shift finger moved to disengage the fifth gear, and FIG. 15(c) is a partial sectional view illustrating the corresponding positioning of the sleeves (with the fifth gear disengaged and the fourth gear engaged).

DETAILED DESCRIPTION OF THE INVENTION

Figure 1:
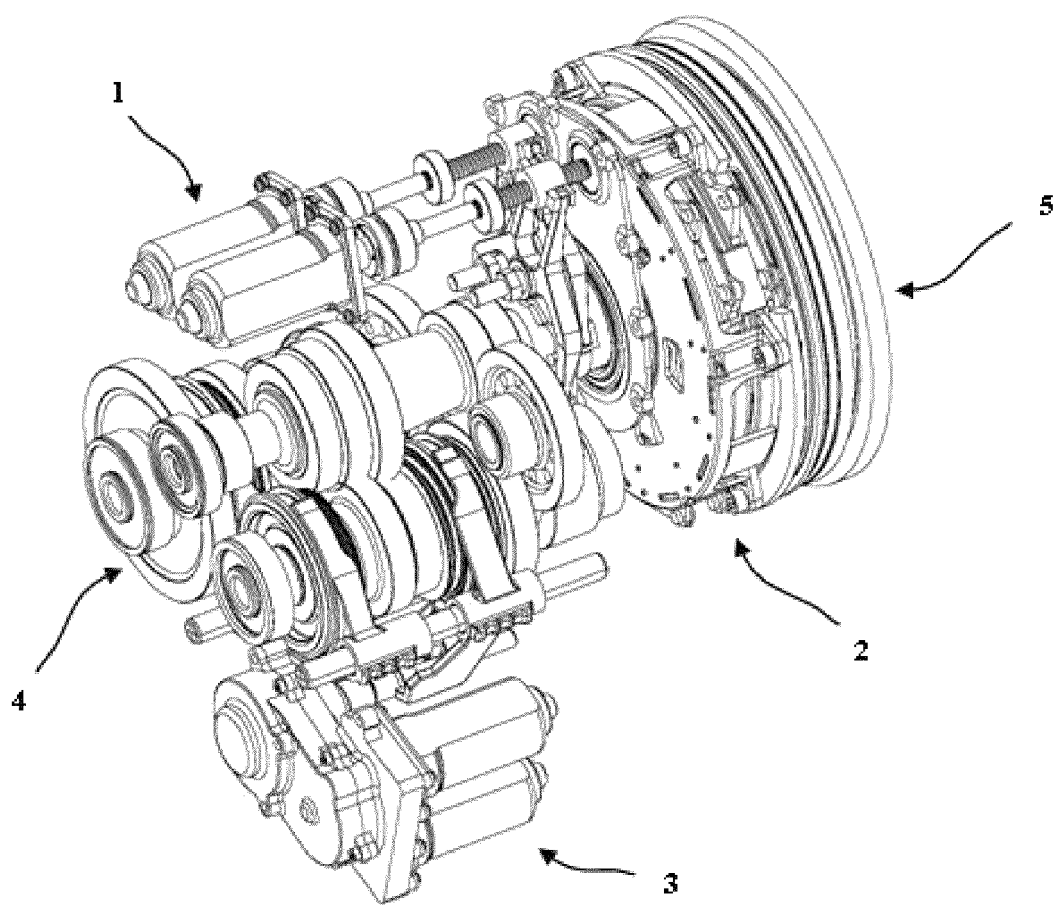
FIG. 1 illustrates one example of a dual clutch transmission to which the gear shifting device of the present invention is incorporated.

Preferred embodiments of the present invention are described herein with reference to the drawings. Throughout the drawings and associated descriptions of the present application, common or similar elements are to be referred with the same or similar reference characters for simplicity purposes.

Figure 2:
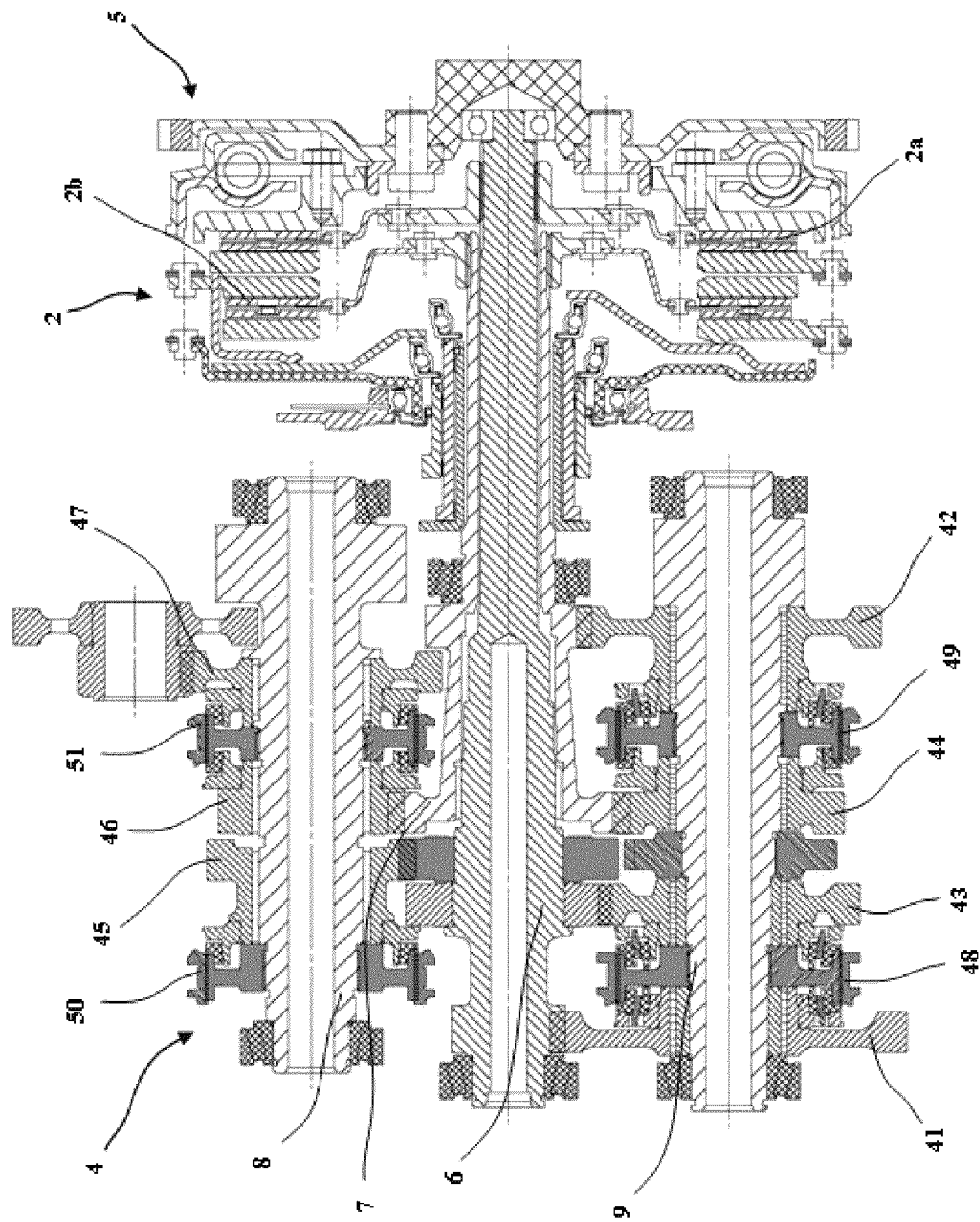
FIG. 2 shows a side cross-sectional view of the dual clutch transmission of FIG. 1.

FIGS. 1 and 2 illustrate one example of a transmission, in particular, a dual or double clutch transmission, to which the gear shifting device of the present invention is incorporated. The dual clutch transmission is designed to have six gear speeds with two clutches 2a and 2b coupled with two input shafts 6 and 7 to drive the gear train 4 installed between the two input shafts 6 and 7 and two output shafts 8 and 9. The dual clutch transmission includes a dual clutch actuator 1, and a dual clutch assembly 2 which contains a first clutch ("clutch A") 2a for driving the odd numbered gears (e.g., first gear 41, third gear 43, and fifth gear 45) and a second clutch ("clutch B") 2b for driving the even numbered gears (e.g., second gear 42, fourth gear 44, sixth gear 46) and reverse gear 47 in response to actuation by the dual clutch actuator 1. The transmission may further include a dual mass flywheel 5 to facilitate a stable and non-fluctuating operation of the transmission.

In order to perform the gear shifting process, the transmission of the invention further includes a gear shift actuating device (to be described below in detail) coupled thereto, which is driven by a gear shift actuator such as an electric motor. To activate the gear shifting in accordance with operation of the actuator, a plurality of sliding sleeves 48-51 are further provided. In this embodiment, sleeve 48 is for shifting between the first and third gears, sleeve 49 for shifting between the second and fourth gears, sleeve 50 for shifting into the fifth gear, and sleeve 51 for shifting between the sixth and reverse gears.

In order to mimic an automatic transmission with seamless gear shifting, the dual clutch transmission enables a "pre-selection" of one gear among multiple gears by allowing the shifter to engage a non-driven gear while the vehicle is driving with another gear engaged. For example, when starting the vehicle, the transmission is in first gear (41) with clutch "A" (2a) applied, and clutch "B" (2b) is released. To shift into second gear (42), the shifter pre-selects the second gear (42), which is idle. Clutch A (2a) is then released, and clutch B (2b) is applied to drive with the second gear (42). The first gear (41) is then disengaged while the transmission is driving in second gear (42). To continue the sequence and shift to third gear (43), the third gear (43) is pre-selected. Then clutch B (2b) is released, and clutch A (2a) is applied. The second gear (42) is then disengaged. This sequence proceeds automatically and up to the maximum gear step of the vehicle, for example, the sixth gear (46).

Figure 4A:
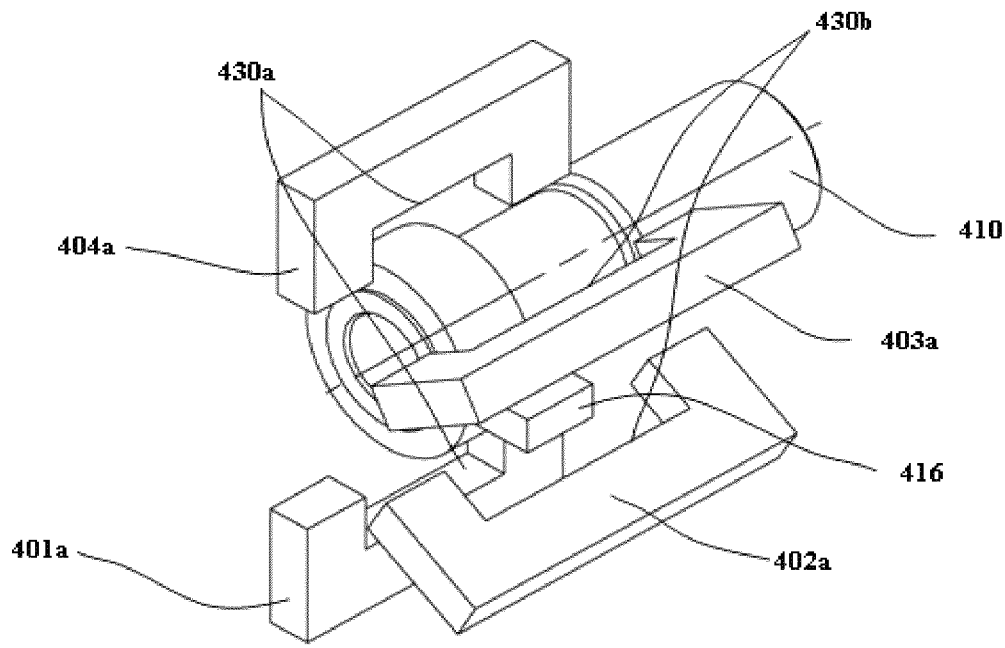
FIG. 4a is a schematic perspective view, shown in part, for illustrating the general appearance of operating portions of the gear shifting device according to the present invention.
Figure 4B:
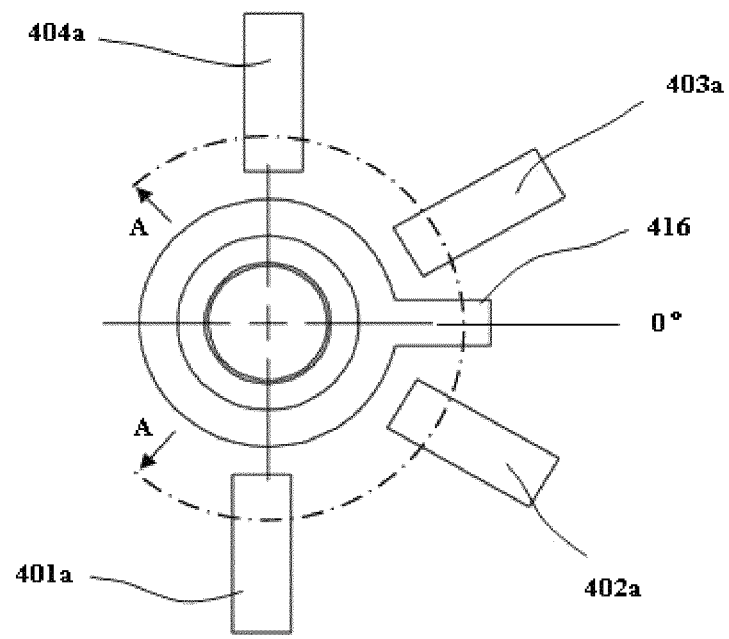
Figure 4C:
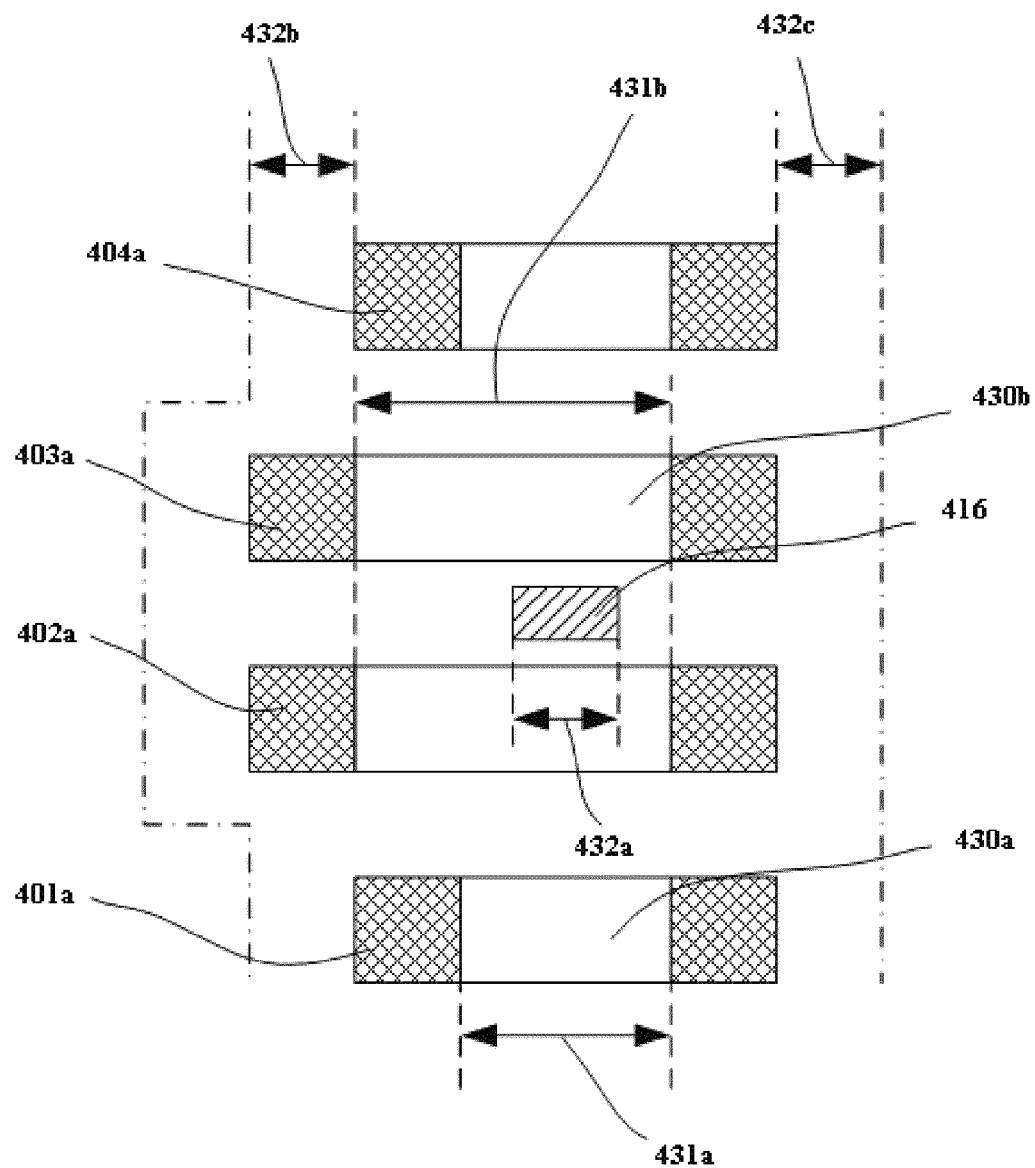
FIG. 4c is a cross-sectional view of the gear shifting device of the invention, taken along line A-A of FIG. 4b, and illustrating a position with the shift finger in neutral position.
Figure 5:
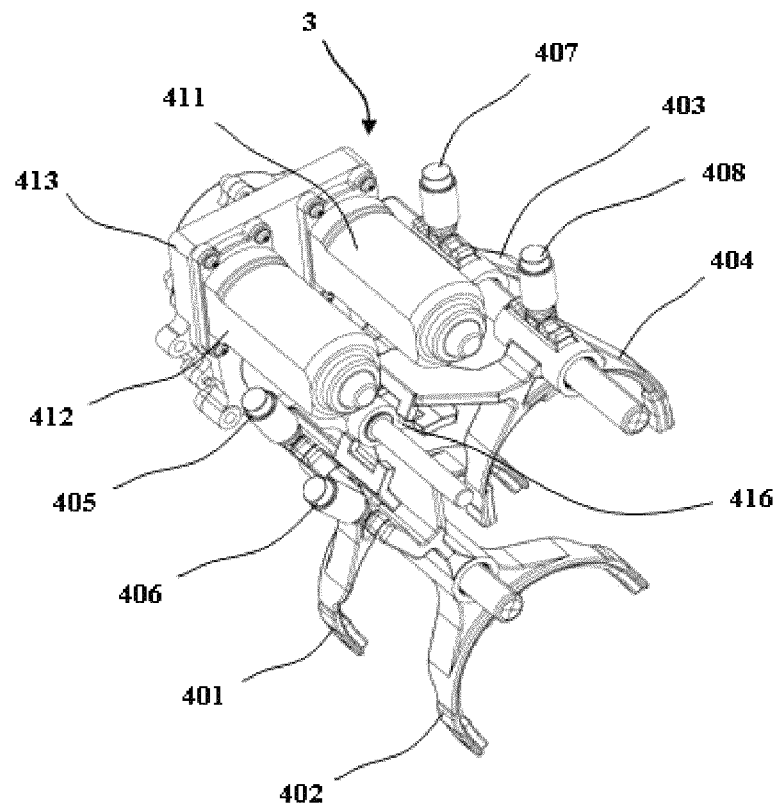
FIG. 5 is a perspective view illustrating one preferred embodiment of the gear shifting device of the invention.
Figure 6:
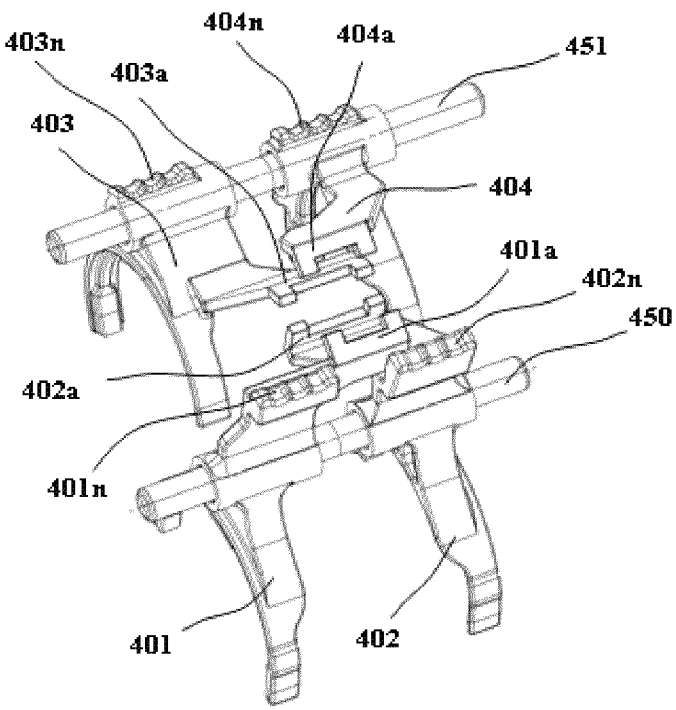
FIG. 6 is a perspective view illustrating the structure of the shift forks of the gear shifting device of FIG. 5.

With reference to FIGS. 4a-4d, one preferred embodiment of the gear shift operating mechanism for the gear shift actuating device is described herein in detail. In this embodiment, the gear shift actuating device includes a plurality of shift effecting members, for example, such as shift forks 401, 402, 403, and 404 (as shown in FIGS. 5 and 6), that are configured to move the sliding sleeves 48-51 for the gear shift operation, of which shift forks only the actuating end portions 401a, 402a, 403a, and 404a formed at terminal ends of the shift forks are shown in FIG. 4a in order to explain the gear shifting mechanism with simplicity. The gear shift actuating device further includes shift shaft 410 which is configured to pivot or swivel around the longitudinal axis of the shift shaft for locating shift finger 416 of the shift shaft 410 at predetermined pivot positions to select a particular actuating end portion 401a, 402a, 403a, or 404a of the shift effecting members (e.g., shift forks) for the intended shift operation of the gears, and also configured to reciprocate in the axial direction for moving the selected shift fork in the axial direction to execute the shifting operation of the shift fork and the gear. In FIGS. 4a and 4b, the shift finger 416 is shown to be in neutral position (at 0° position) between the terminal end elements 402a and 403a of shift forks 402 and 403.

As shown in FIG. 4a, each of the terminal end elements 401a, 402a, 403a, and 404a of the shift forks has a finger receiving groove or opening 430a or 430b to receive the shift finger 416 in the opening. Contrary to the conventional shift device shown in FIG. 3c which has the same width 331a for the cam groove 306 of each shift frame 301-304, the finger receiving opening 430a for the first and fourth shift forks 401 and 404 has a smaller opening width 431a, and the finger receiving opening 430b for the second and third shift forks 402 and 403 has a larger opening width 431b (see FIGS. 4a and 4c). The size of the smaller opening width 431a is preferably a little (e.g., 0.0-2.5 mm) larger than two times the width 432a of the shift finger 416, and the size of the larger opening width 431b is preferably a little (e.g., 0.0-2.5 mm) larger than three times the width 432a of the shift finger 416. In this manner, since the opening sizes of two inner terminal end elements 402a and 403a of the shift forks have a relatively larger dimension than those of two outer end elements 401a and 404a, the movement of the shift fingers 416 between the openings 430a and 430b of the shift forks can be effectively and easily made in order to control the gear shifting operation, as will be described below in further details.

Figure 3A:
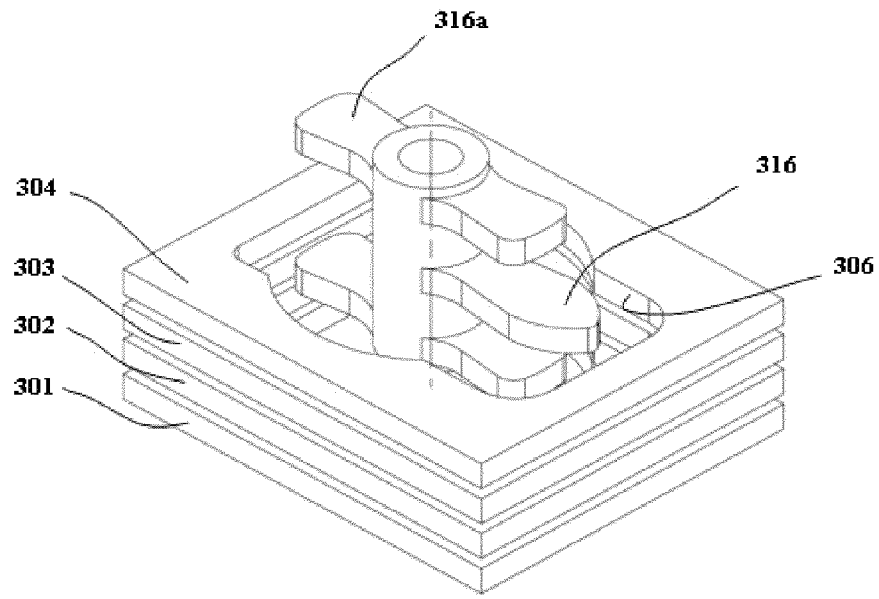
FIG. 3a is a schematic perspective view, shown in part, for illustrating the operating portions of a conventional gear shifting device.
Figure 3B:
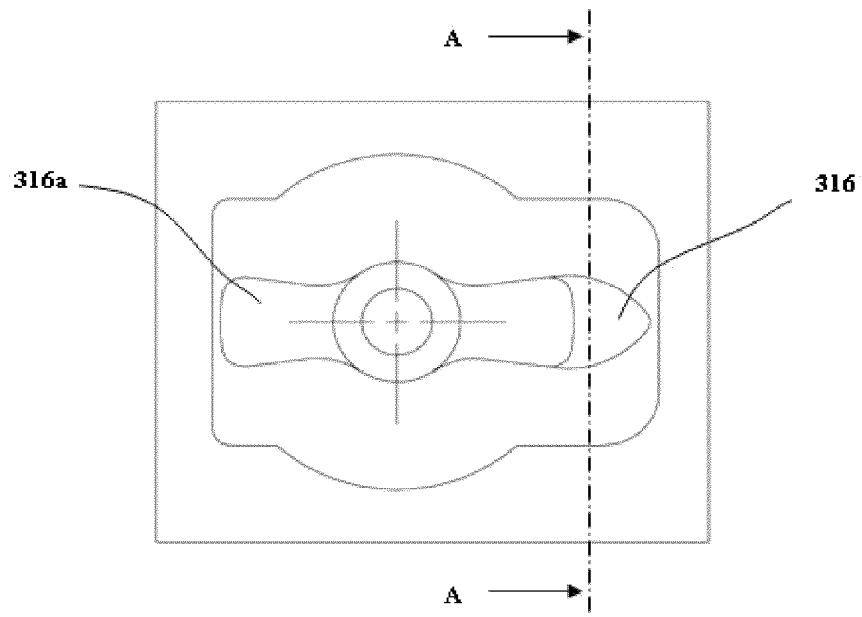
Figure 3C:
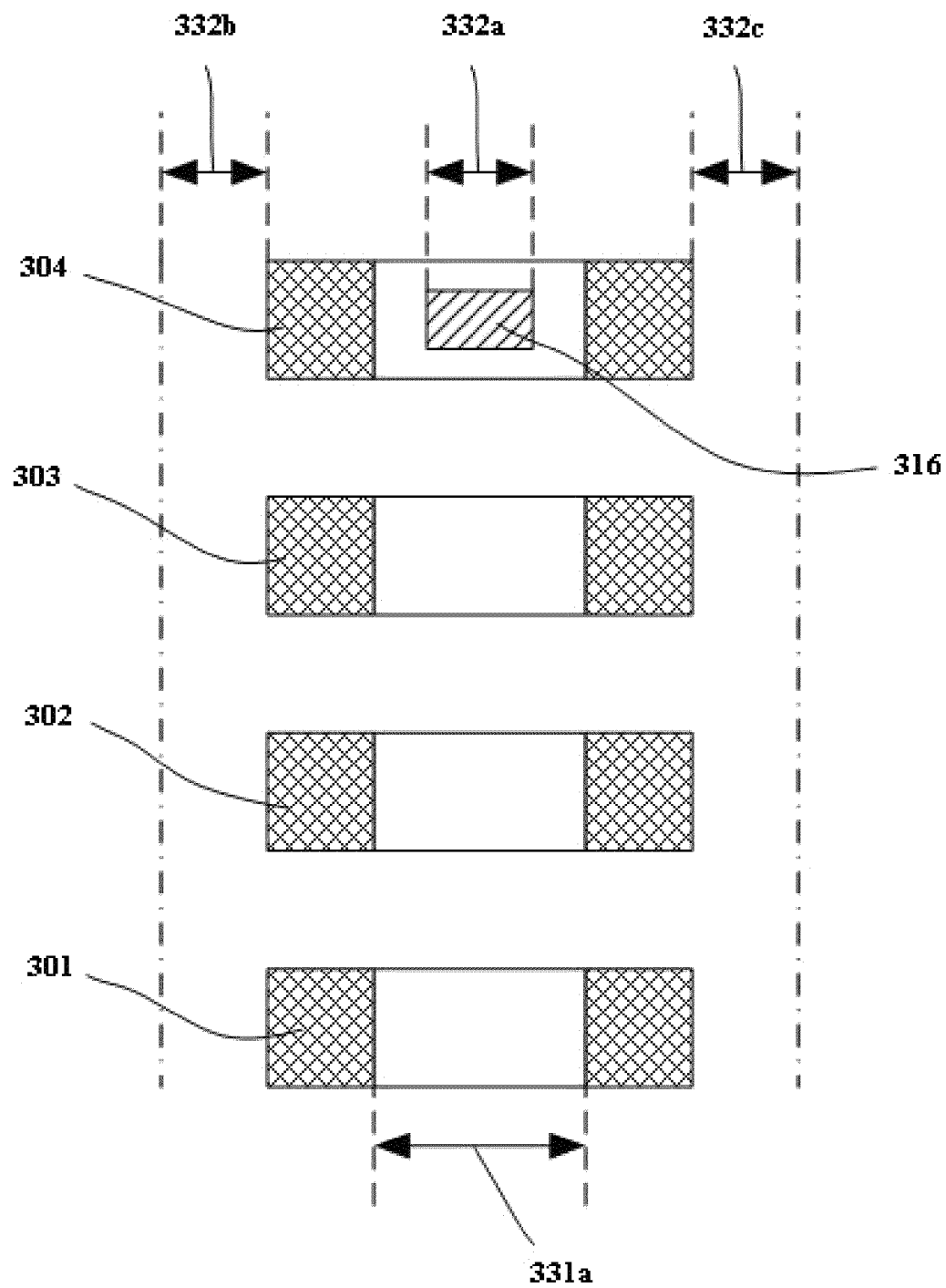
FIG. 3c is a cross-sectional view of the conventional gear shifting device, taken along line A-A of FIG. 3b.

Moreover, the shift finger 416 has a simple shape, for example, such as a rectangular bar shape as shown in FIG. 4a or a cylindrical or oval shape (not shown), and the finger receiving openings 430a and 430b also have a simple shape, for example, such as a rectangular opening as shown in FIG. 4a, or the like. Therefore, the gear shift actuating device of the present invention can be produced easily with relatively low cost than the conventional shift device having complex and precisely-made cam parts as shown in FIG. 3a, for example. Moreover, in the present invention the gear engagement and disengagement operations can be executed with simplified control by the same shift finger 416. This is contrary to the conventional shift devices described above in connection with FIGS. 3a-3c, which require a relatively complex control with multiple activation elements, namely, with shift finger 316 for gear engagement operation and with separate elements (i.e., a plurality of disengagement cams 316a) for gear disengagement operation. As such, the gear shift actuating operation of the present invention can be controlled more easily than the conventional shift devices of known types.

Furthermore, contrary to the afore-mentioned conventional shifting devices (see FIG. 3a) having a perpendicular arrangement of the drive shaft 315 relative to the axis of the fork guide rails, the shifting mechanism of the present invention (see FIGS. 4a and 5-7) is placed in parallel relation with the direction of the fork guide rails. Thus, the shifting device of the invention can simplify the design, reduce the length of the very long shift forks of the conventional design, and also reduce the vertical height and volume of the resultant transmission package.

Figure 4D:
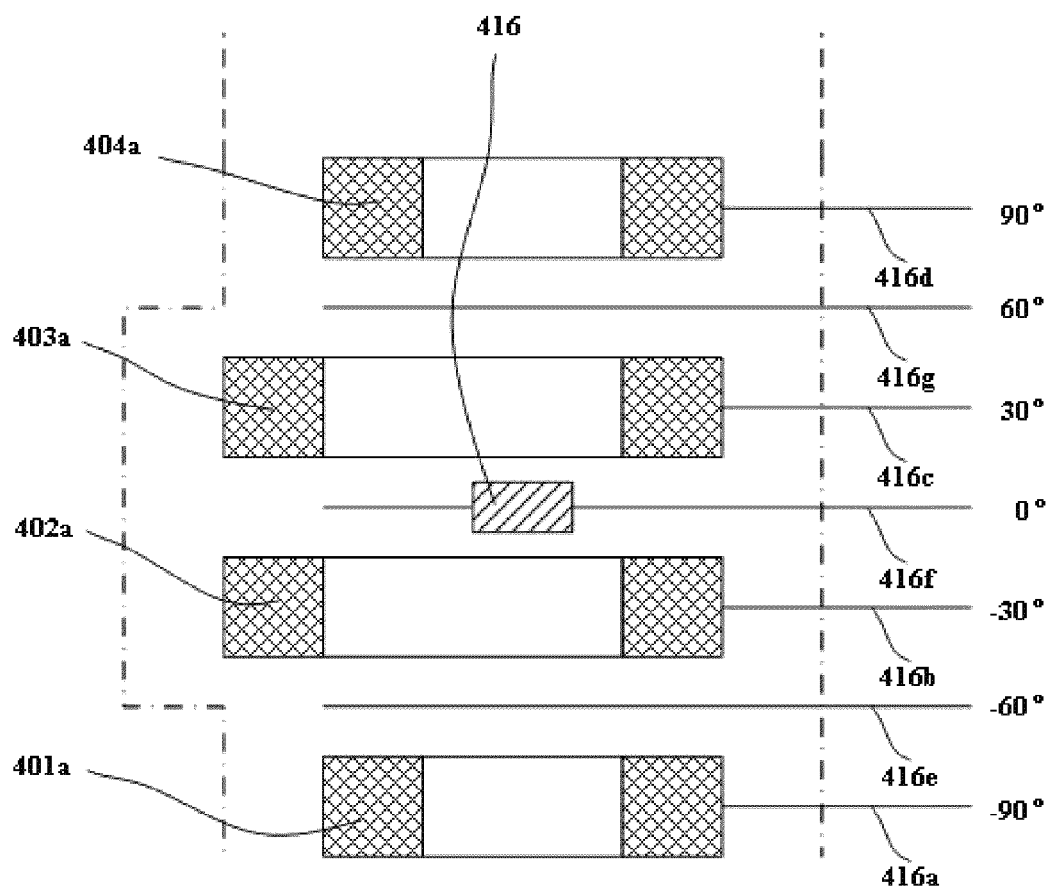
FIG. 4d is a cross-sectional view similar to FIG. 4c, further illustrating the angular pivot positions of the shift finger relative to the terminal end portions of the shift forks.

Referring to FIGS. 4b and 4d, the angular positioning and movement of the shifter is described herein. The end elements 401a-404a (of shift forks 401-404) are displaced angularly by the same angle. In an exemplary embodiment as shown in FIGS. 4b and 4d, the four end elements 401a-404a are arranged in a circular pattern with 60° angular displacement between the adjacent ones. Thus, when the horizontal angle is set to 0° position, the end element 401a (of shift fork 401) is located at minus(−) 90° position, the end element 402a (of shift fork 402) at minus(−) 30° position, the end element 403a (of shift fork 403) at 30° position, and the end element 404a (of shift fork 404) at 90° position. Here, the shift finger 416 is shown to be positioned in neutral location with 0° angular position. The actuator, in particular, the shift motor (to be described below) for angular movement of the shift finger 416, is designed to rotate or swivel the shift shaft 410 (consequently, the shift finger 416 as well) in the same increment of, preferably, 30° per step. Thus, in this embodiment, when the shift finger 416 is positioned at −90° position (416a), −30° position (416b), 30° position (416c), or 90° position (416d), it can engage with the end elements 401a, 402a, 403a, and 404a, respectively, to shift the selected shift forks for engaging and disengaging the selected gears. However, if the shift finger 416 is positioned at −60° position (416e), 0° position (416f), or 60° position (416g), it idles and does not actuate any shifting of the shift forks even though it reciprocates in the axial direction of the shift shaft 410.

Figure 7A:
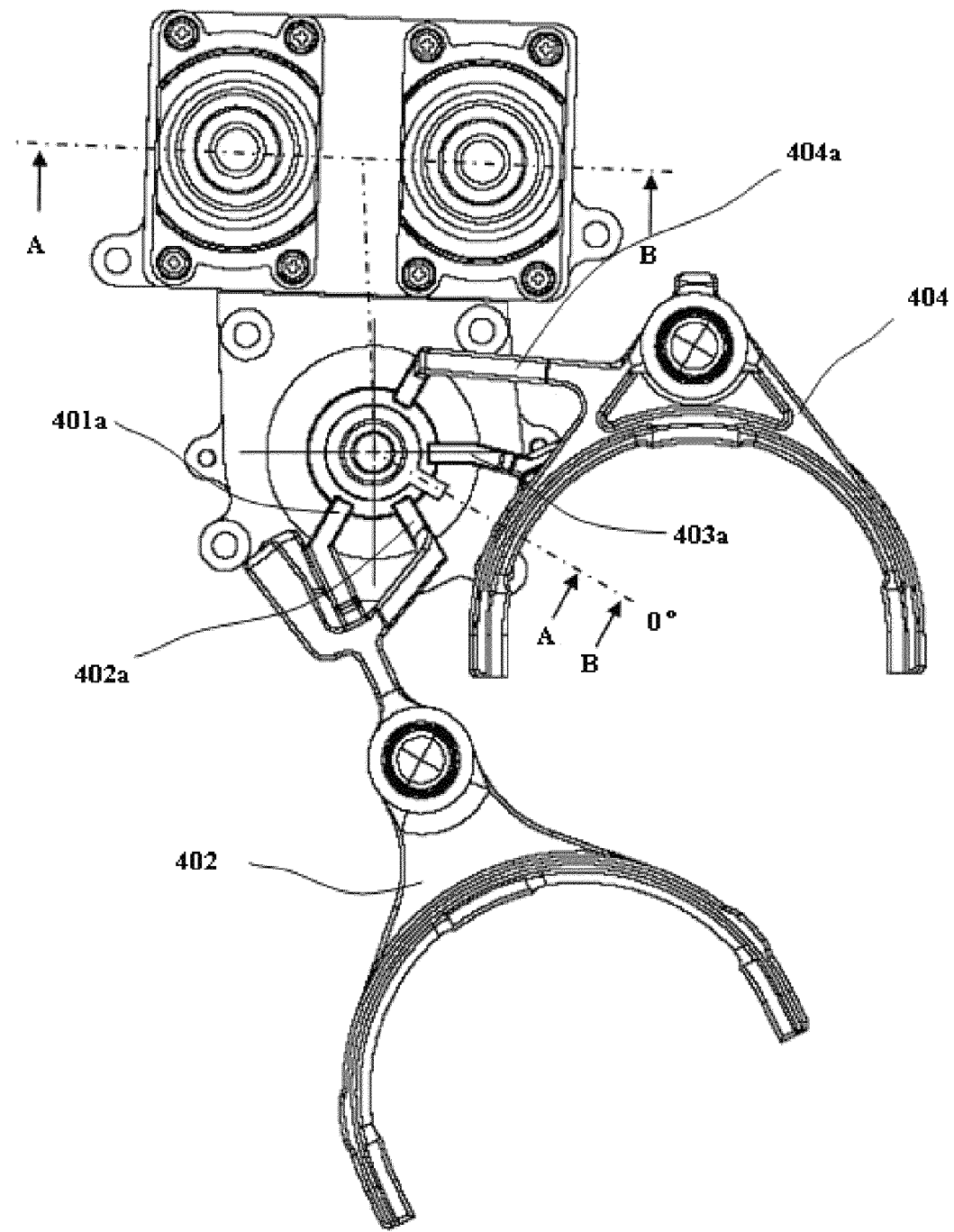
FIG. 7a is a front view of the gear shifting device of FIG. 5.

With reference to FIGS. 5, 6, and 7a, a preferred embodiment of the gear shifting device of the invention is described herein in further details.

The gear shifting device includes two actuators, namely, gear selector motor 412 and gear shift motor 411 positioned in the proximity of each other, and preferably, in parallel relation to each other and to the fork guide rails (450, 451) as well, in order to actuate the gear shift operation (to be described below in further details). The gear shifting device further includes reduction gear box 413 with gears arranged therein for the gear shift operation, and two parallel guide rails 450 and 451 disposed preferably in parallel relation with the two actuators 411 and 412. Shift fork 401 and shift fork 402 are slidably arranged on the first guide rail 450, and shift fork 403 and shift fork 404 are slidably arranged on the second guide rail 451, in which shift fork 401 is for shifting between the first and third gears, shift fork 402 for the second and fourth gears, shift fork 403 for the fifth gear, and shift fork 404 for the sixth and reverse gears. The shift device may further include spring-loaded detents 405, 406, 407, 408 to engage with multiple notches 401n-404n of the shift forks 401-401 mounted in the transmission housing and configured to hold the shift forks in the selected axial positions (among the neutral position and the engagement positions) until the shift finger 416 moves the shift fork to the next gear.

With reference to FIG. 7a through FIG. 9b, the gear shifting operation (comprised of the gear "selecting" sub-operation and the gear "shifting" sub-operation described below) and structural elements for the operations are described herein in detail. In the following disclosure, the gear "selecting" portions and the gear "selecting" sub-operation are referred to the parts (and associated operations thereof) which perform the selection of a particular shift fork among multiple forks 401-404 through the pivotal or swivel movement of the shift finger 416. In addition, the gear "shifting" portions and "shifting" sub-operation are referred to the parts (and associated operations thereof) which perform the ultimate engagement (and disengagement) operation of a selected gear through the axial movement of the shift finger 416 to effect the gear shift, and subsequently to the aforementioned "selecting" sub-operation.

Figure 7B:
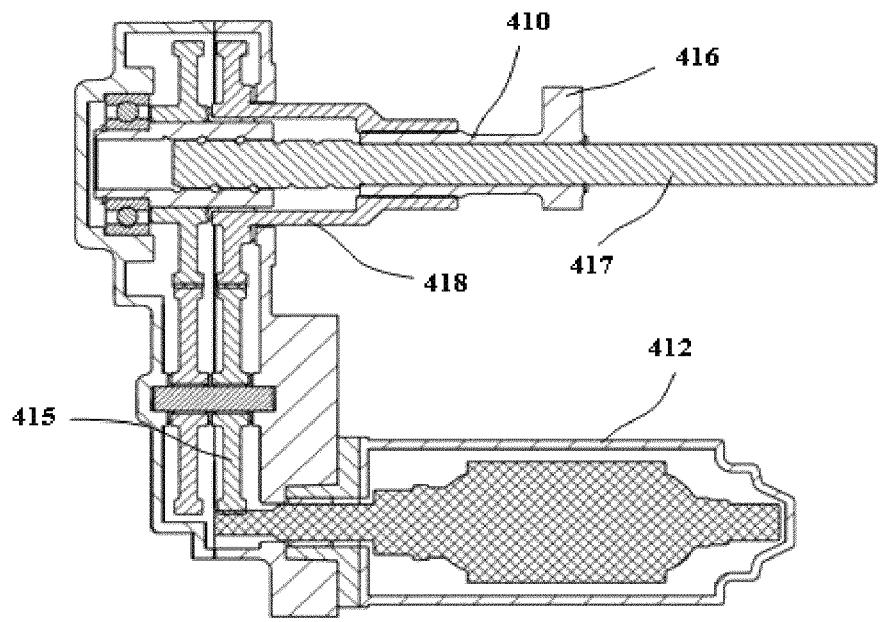
FIG. 7b is a side cross-sectional view of the gear shifting device of FIG. 5, taken along line A-A of FIG. 7a and illustrating only the gear "selecting" portions of the gear shifting device.
Figure 8A:
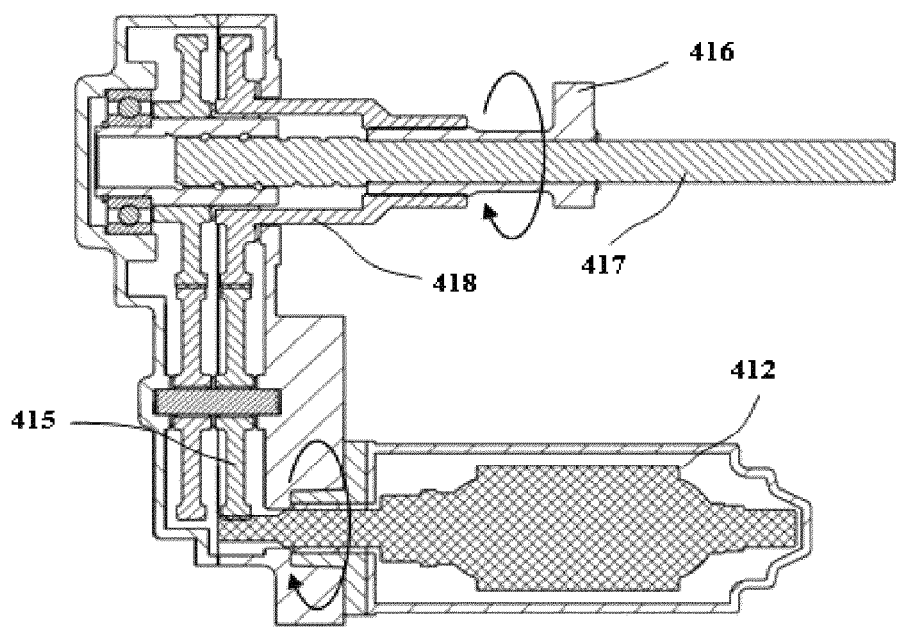
FIG. 8a is a view similar to FIG. 7b for illustrating the operation of the gear "selecting" portions of the gear shifting device.
Figure 8B:
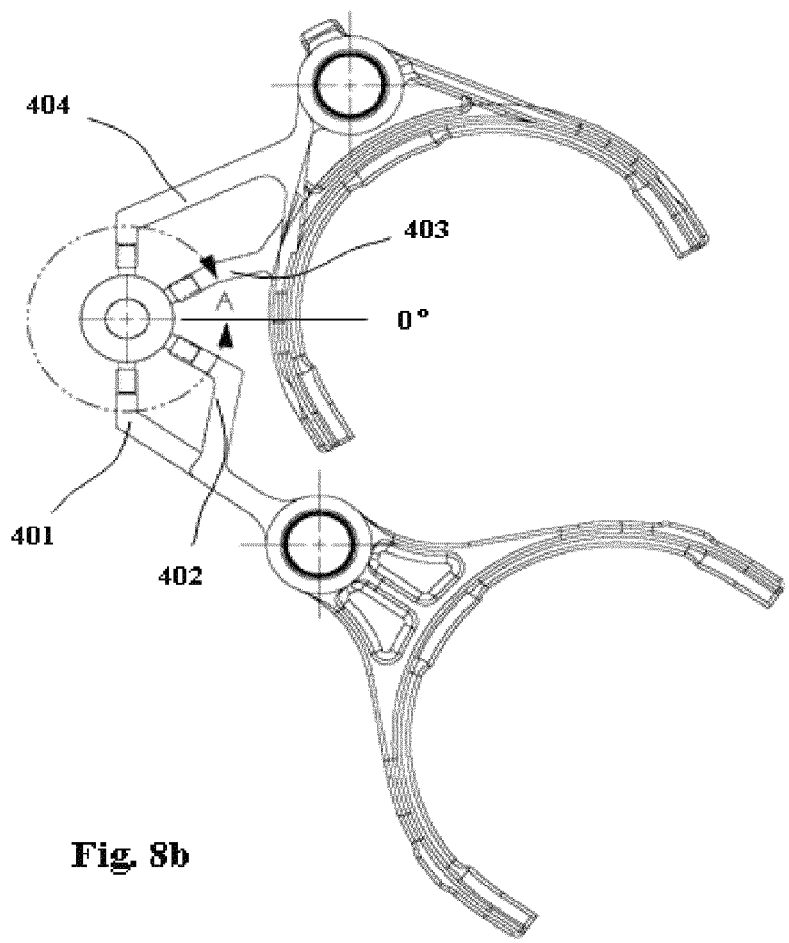
FIG. 8b is a front view for illustrating the gear "selecting" sub-operation of the gear shifting device.
Figure 8C:
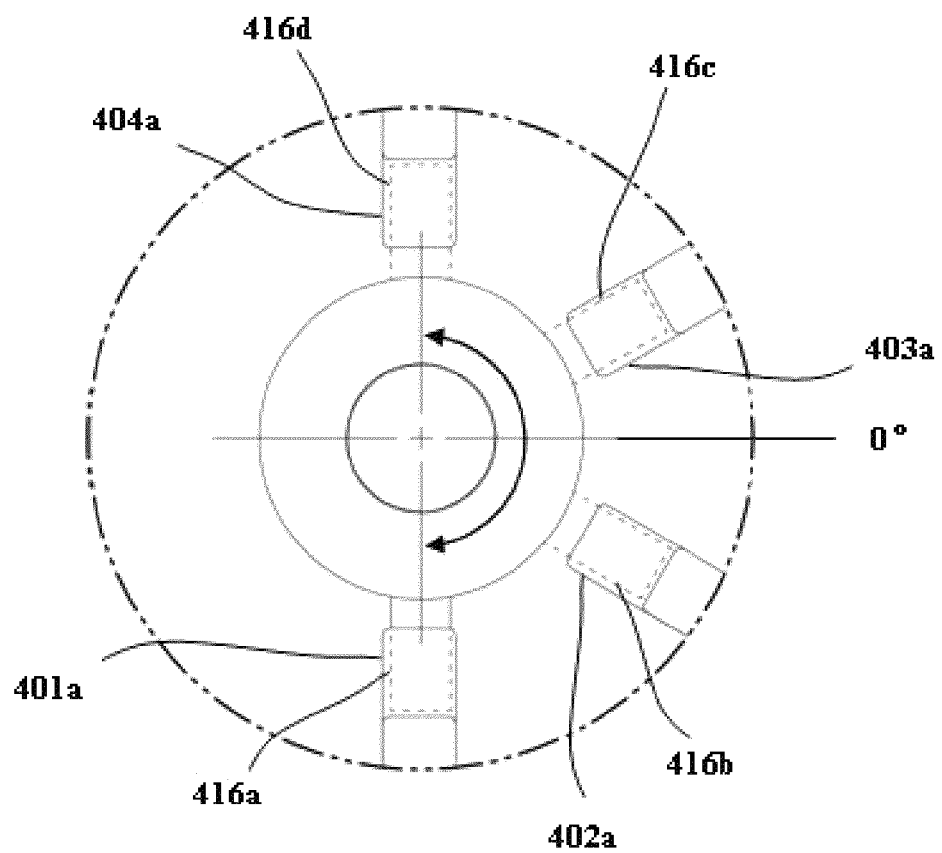
FIG. 8c is an enlarged view for section A of FIG. 8b, showing the details of the shift finger and the terminal end portions of the gear shift forks, and further illustrating the gear selecting sub-operation of the gear shifting device.

Referring now to FIGS. 7a, 7b, 8a-8c, the gear "selecting" portions of the gear shifting device and the gear "selecting" sub-operation are described in further details. As shown in FIG. 7b (which is a side cross-sectional view of the gear shifting device of FIG. 5, taken along line A-A of FIG. 7a), the gear selecting portions of the gear shifting device includes gear selection actuator or motor 412, reduction gear 415 installed thereto for gear selecting sub-operation, and shift shaft 418 operably coupled to the reduction gear 415 and configured to pivotally rotate the shift finger 416 for the gear selecting sub-operation (see FIG. 8a). As mentioned above and shown in FIGS. 8b and 8c, the selector motor 412 is designed to pivotally rotate the shift shaft 410 (and the shift finger 416 as well) in the same increment of, preferably, 30° per step. Thus, when the shift finger 416 is positioned at −90° position, −30° position, 30° position, or 90° position, it can select or engage with the end elements 401a, 402a, 403a, and 404a, respectively, to shift the selected shift forks 401-404 for the subsequent engaging and disengaging sub-operation for the selected gears (as will be described below). However, if the shift finger 416 is positioned at neutral positions, namely, at −60° position, 0° position, or 60° position, it idles and does not effect any shifting of the shift forks even though it reciprocates in the axial direction of the shift shaft 410. FIG. 8c illustrates a state when the shift finger 416 is aligned with the first end element 401a (in solid line) of the shift fork, with other alignment states shown in broken lines to facilitate understanding of the selecting sub-operation.

Figure 7C:
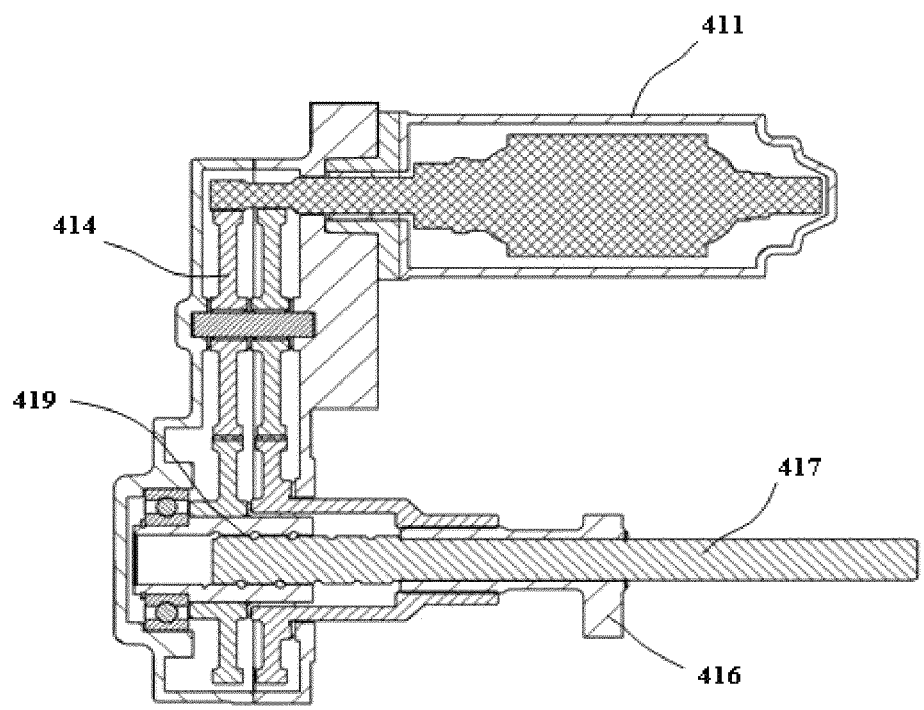
FIG. 7c is a side cross-sectional view of the gear shifting device of FIG. 5, taken along line B-B of FIG. 7a and illustrating only the gear "shifting" portions of the gear shifting device.
Figure 9A:
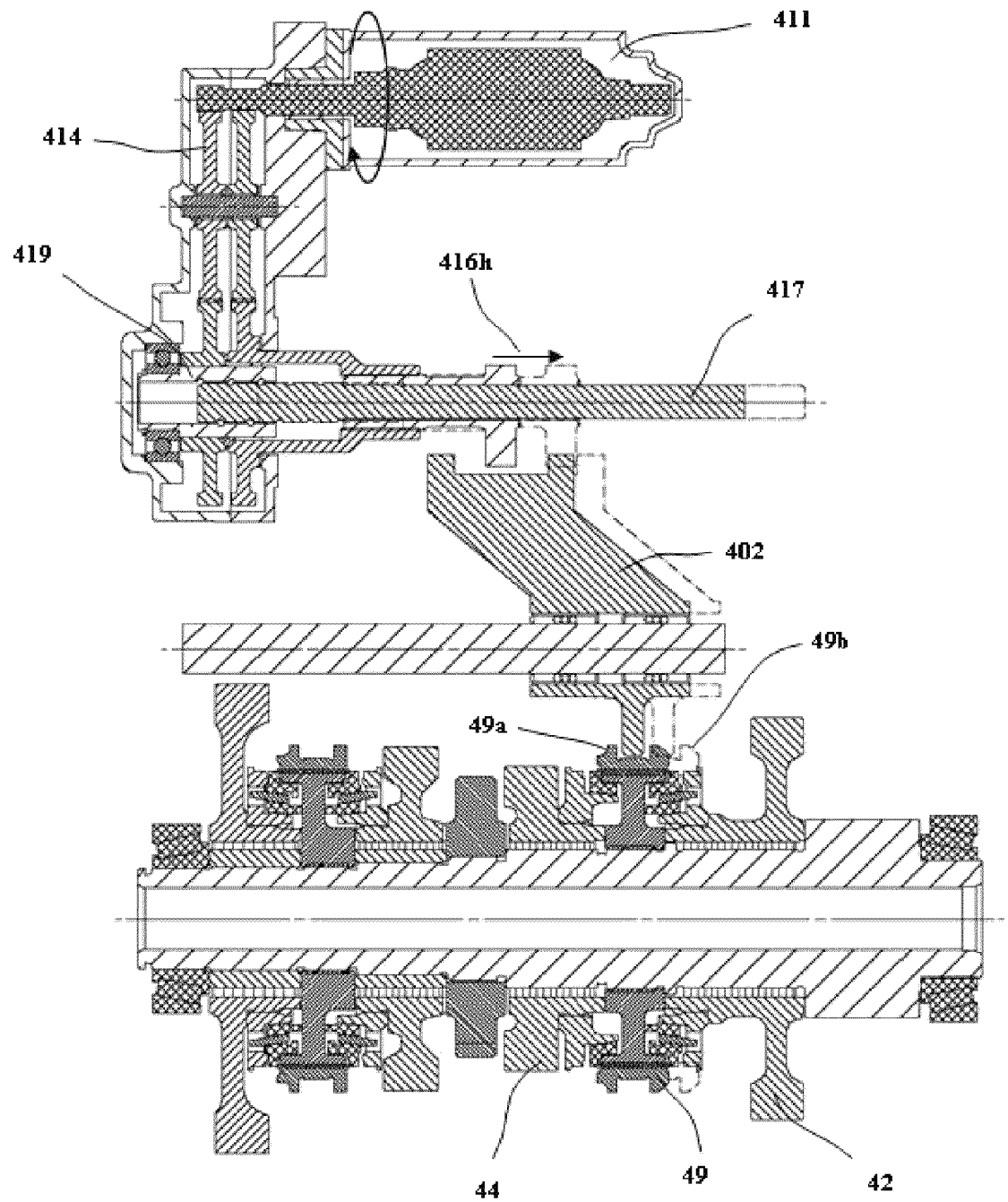
FIG. 9a is a sectional view illustrating the gear "shifting" sub-operation of the gear shifting device and showing the movement of a shift fork in one direction.

Referring now to FIGS. 7a, 7c, 9a, 9b, the gear "shifting" portions of the gear shifting device and the gear "shifting" sub-operation are described in further details. As shown in FIG. 7c (which is a side cross-sectional view of the gear shifting device of FIG. 5, taken along line B-B of FIG. 7a), the gear shifting portions of the gear shifting device includes gear shift actuator or motor 411, reduction gear 414 installed thereto for gear shift sub-operation, and ball screw 419 operably coupled to the reduction gear 414 and configured to move the shift finger 416 in axial direction for the gear shifting sub-operation (see FIGS. 9a and 9b). In particular, as shown in FIG. 9a, when the gear shift motor 411 rotates in one direction (e.g., counter-clockwise direction) by controller (not shown) of the vehicle, the shift finger 416 moves axially in direction 416h by operation of a shift finger drive means, in particular, ball screw shaft 417 coupled with ball screw 419, and as a result, the shift finger 416 pushes the terminal end element of selected shift fork (for example, shift fork 402 as shown in FIG. 9a) in the manner as described above in connection with FIGS. 4a and 4c. As consequence, the sleeve 49 coupled to the selected shift fork (for example, sleeve 49 for second gear 42 and fourth gear 44 as shown) moves in the same axial direction 416h, and concludes the shift operation to a target gear (e.g., second gear 42) selected or pre-selected in a manner described above.

Figure 9B:
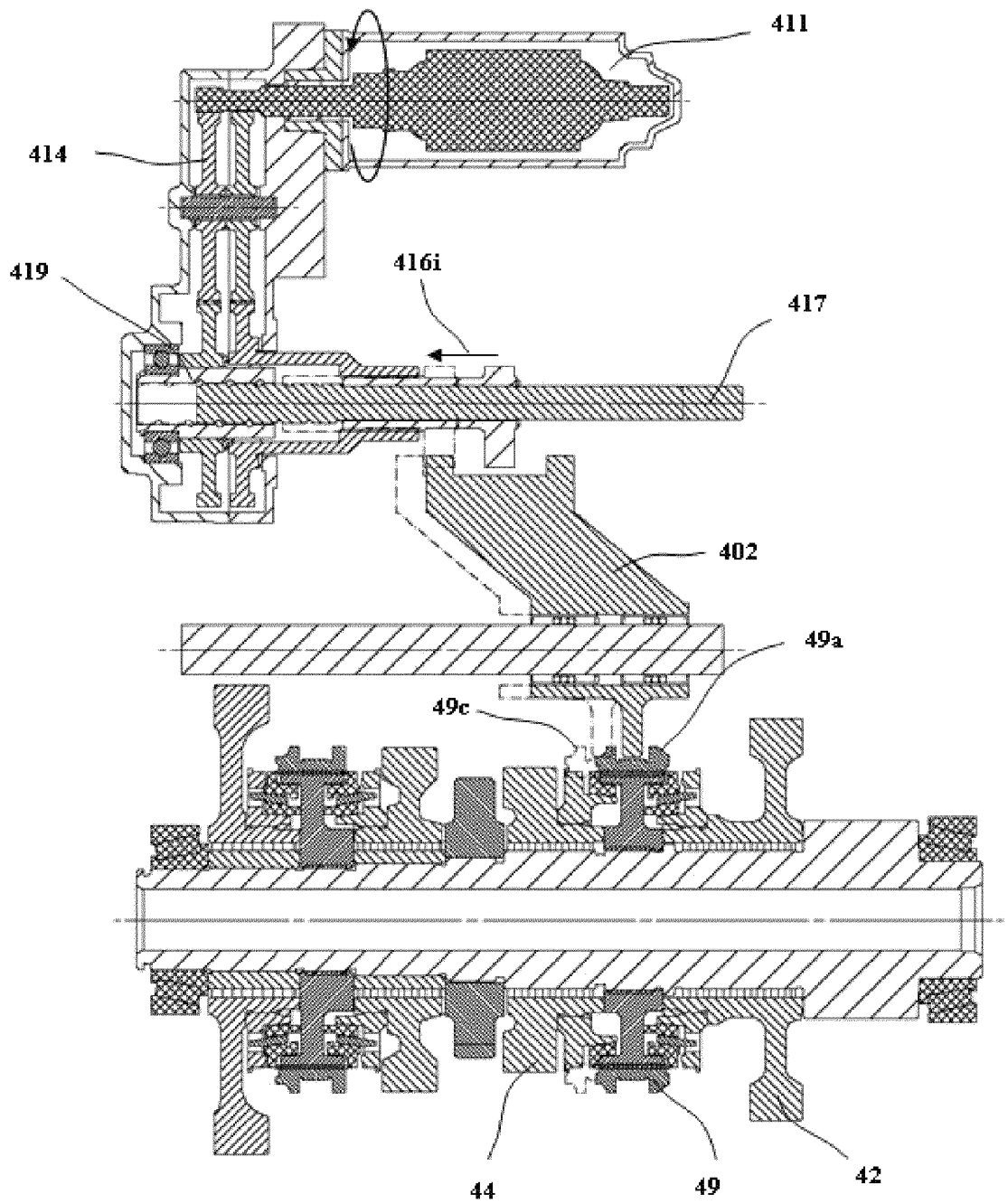
FIG. 9b is a sectional view illustrating the gear shifting sub-operation of the gear shifting device and showing the movement of the shift fork in opposite direction.

On the other hand, as shown in FIG. 9b, when the gear shift motor 411 rotates in an opposite direction (e.g., clockwise direction) by controlled by the controller of the vehicle, the shift finger 416 moves axially in the other direction 416i by operation of ball screw shaft 417 coupled with ball screw 419, and as a result, the shift finger 416 pushes the terminal end element of selected shift fork (for example, shift fork 402 as shown in FIG. 9b) in the direction 416i in the manner as described above in connection with FIGS. 4a and 4c. As consequence, the sleeve 49 coupled to the selected shift fork (for example, sleeve 49 for second gear 42 and fourth gear 44 as shown) moves in the axial direction 416h, and concludes the shift operation to another gear (e.g., fourth gear 44). The above described operations are explained in association with only the shift fork 402 (for second gear 42 and fourth gear 44) for illustrative purposes. However, it is noted that the shifting operations for other gears can be performed in the same or equivalent manner described above.

Figure 10:
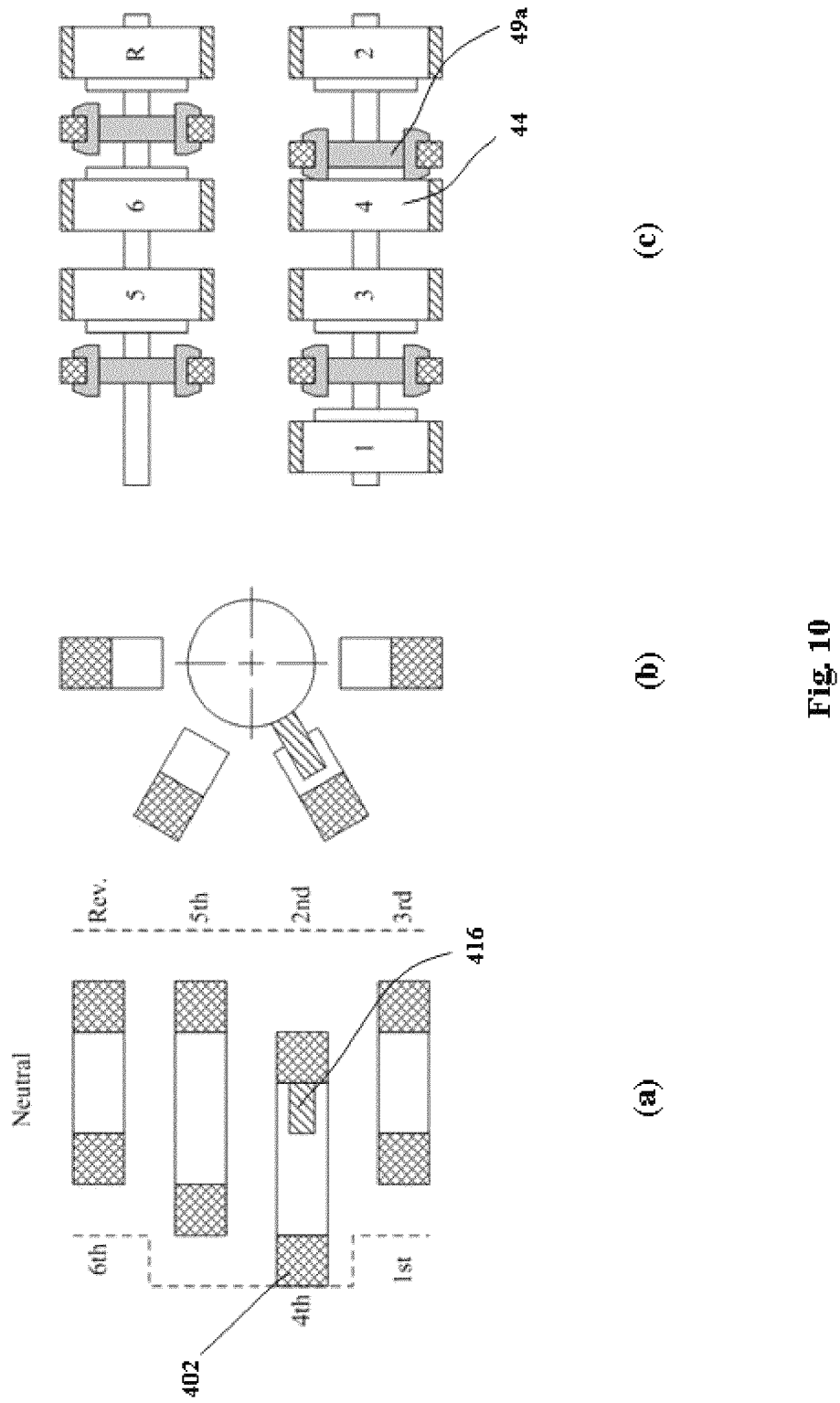
Figure 11:
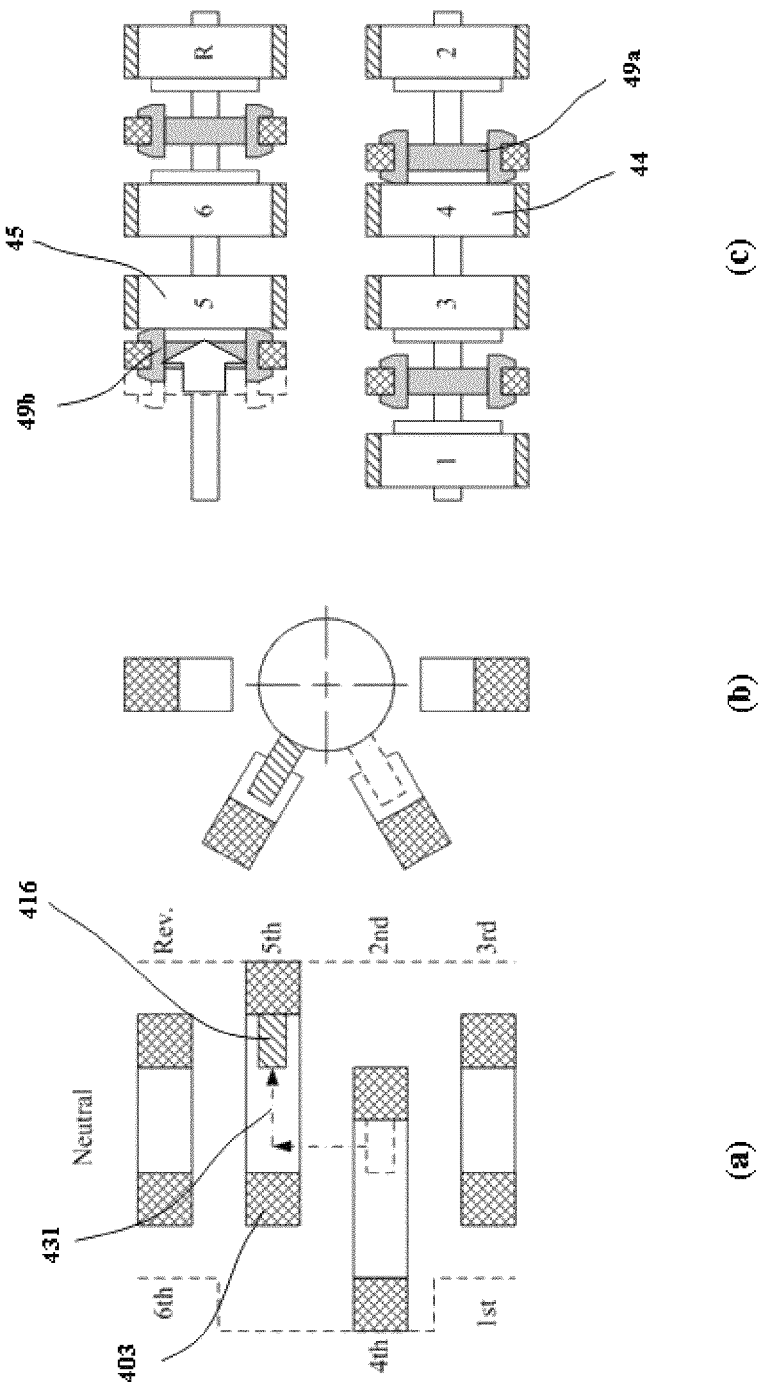
Figure 12:
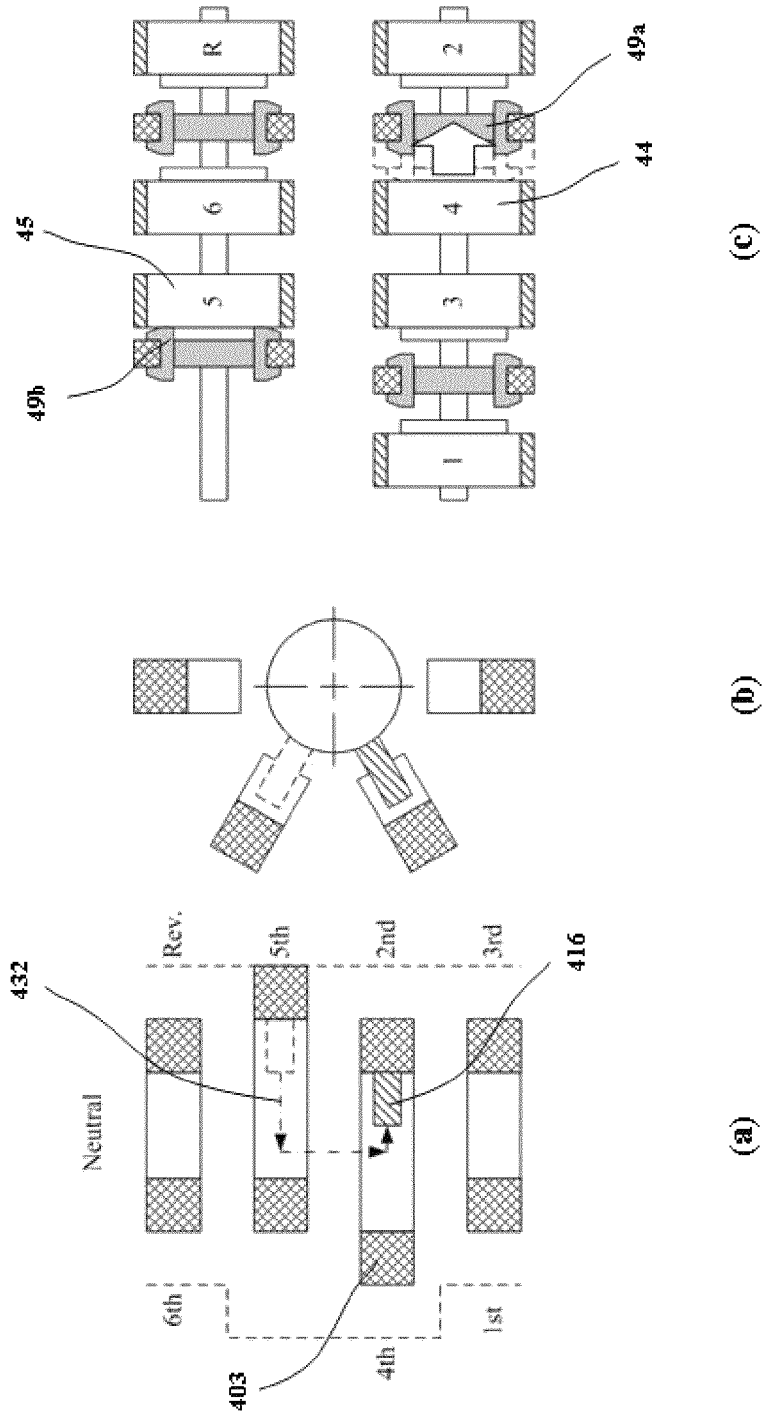
Figure 13:
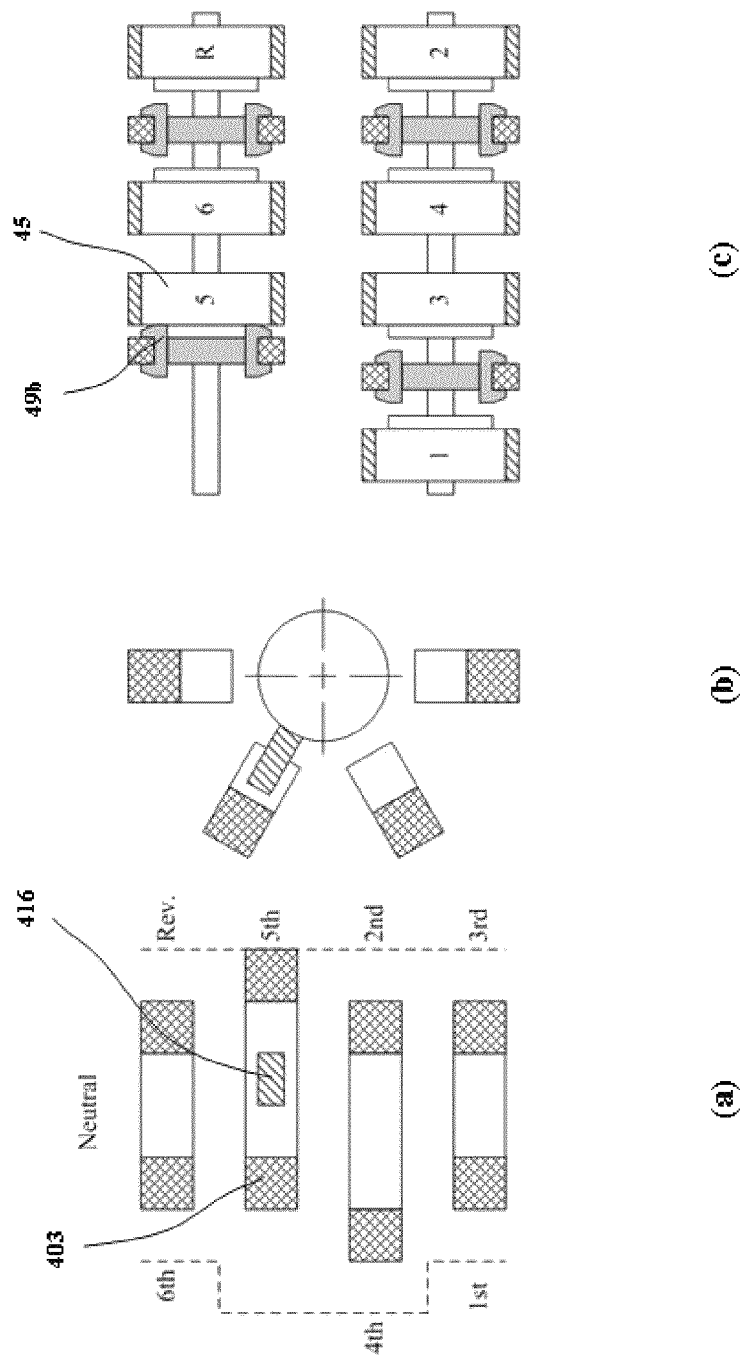
Figure 14:
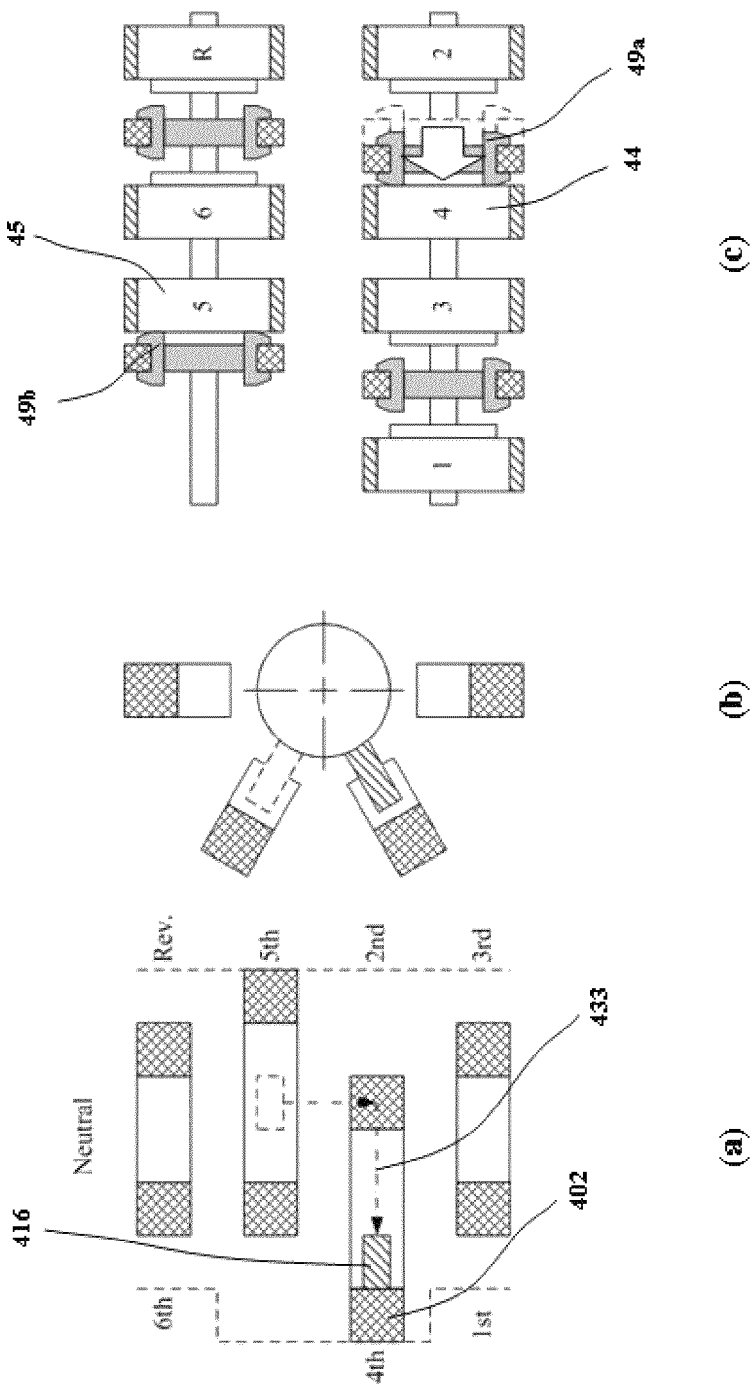
Figure 15:
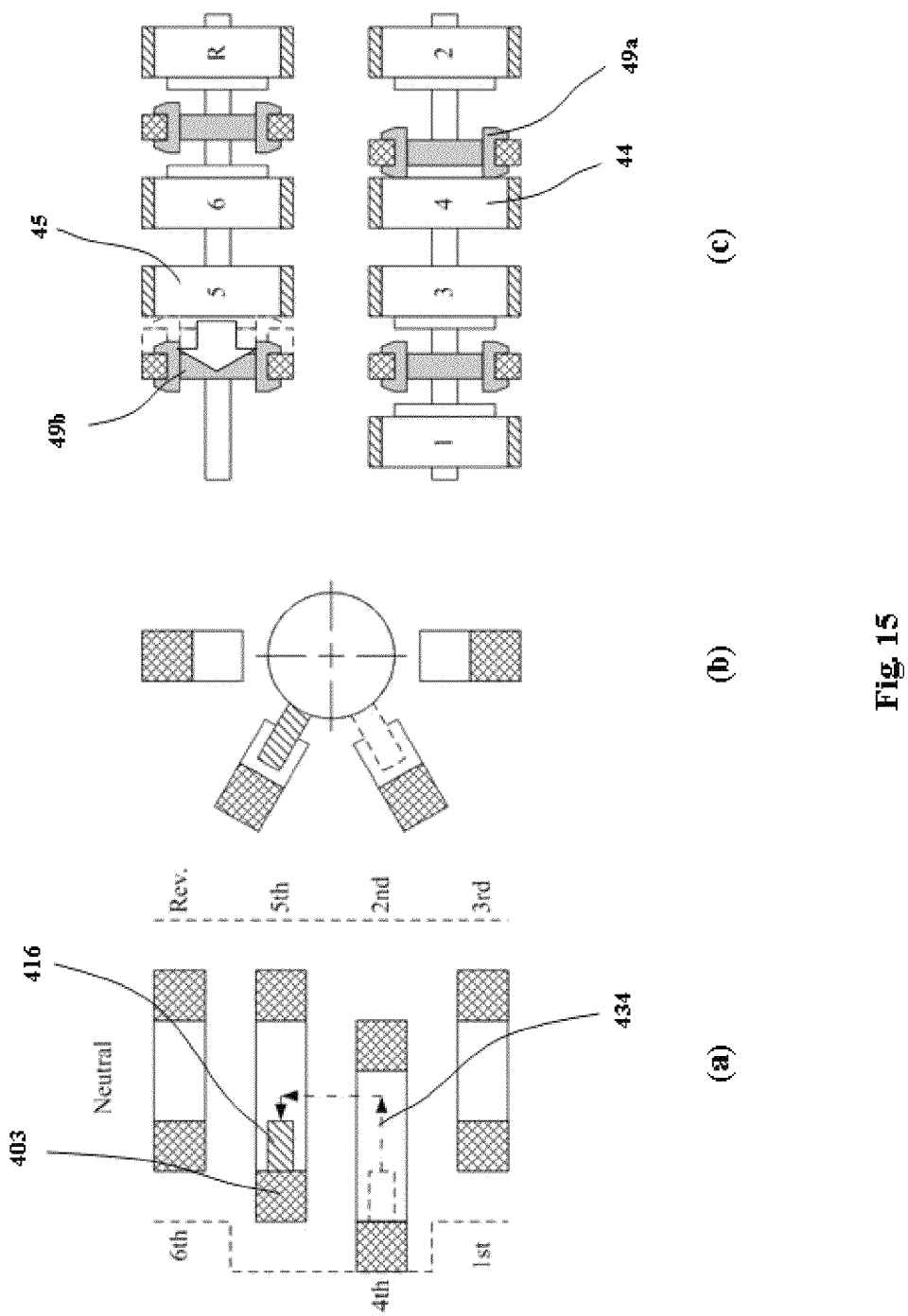

With reference to FIGS. 10-15, the gear shifting operation utilizing the gear shifting device of the invention are further described herein, in which FIGS. 10-12 illustrate an example of gear up-shifting sequence, and FIGS. 13-15 illustrate an example of gear down-shifting sequence.

FIG. 10 illustrates one exemplary stage in which the fourth gear is engaged to drive the vehicle with the fourth gear. As shown in FIGS. 10(a) and 10(c), in this stage the shift fork 402 (for the second and fourth gears) is in the position such that the fourth gear 44 is engaged by the sliding sleeve 49a to drive the vehicle with the fourth gear, and as shown in FIGS. 10(a) and 10(b), the shift finger 416 is received in the opening of the shift fork 402 for the second and fourth gears and located in a stationary position while waiting next command signals from the controller (not shown) of the vehicle. In this stage, "clutch B" of the dual clutch transmission (which is assigned to drive the even numbered gears as described above) is applied while "clutch A" released, and the vehicle is driving with the fourth gear 44.

As illustrated in FIG. 11, when the controller delivers a command for pre-selecting the fifth gear 45 in order to prepare an up-shifting to the upper gear, the gear selector motor 412 and the gear shift motor 411 actuate the shift finger 416 to move it along the shift path 431 (FIG. 11(a)) in the manner as described above, and move the sleeve 49b to engage with the fifth gear 45 (FIG. 11(c)). Here, the vehicle is still driving with the fourth gear 44 since the clutch B is still applied, with clutch A (for odd number gears) released. This is a "pre-selection" of fifth gear.

Now, when the controller delivers a gear shifting command to drive with the fifth gear in accordance with the control of automatic controller (or alternatively upon manual shift operation by the driver), the gear selector motor 412 and the gear shift motor 411 actuate the shift finger 416 to move it along the shift path 432 (FIG. 12(a)), and move the sleeve 49a and release it from the fourth gear 44 (FIG. 12(c)). Then, the clutch B is released, and clutch A (for odd number gears) is applied instantaneously (e.g., in a fraction of a second), and the vehicle is changed to drive with the fifth gear 45.

The above described operations are explained in association with up-shifting between the fourth and fifth gears. However, it is noted that the up-shifting operations for other gears (e.g., between $1^{st}$ and $2^{nd}$ gears, $2^{nd}$ and $3^{rd}$ gears, $3^{rd}$ and $4^{th}$ gears, $5^{th}$ and $6^{th}$ gears, etc.) can be performed in the same or similar manner as described above.

With reference now to FIGS. 13-15, the down-shifting operation of the invention are described herein.

FIG. 13 illustrates a stage in which the fifth gear is engaged to drive the vehicle with the fifth gear. As shown in FIGS. 13(a) and 13(c), in this stage the shift fork 403 (for the fifth gear) is in the position such that the fifth gear 45 is engaged by the sliding sleeve 49b to drive the vehicle with the fifth gear, and as shown in FIGS. 13(a) and 13(b), the shift finger 416 is received in the opening of the shift fork 403 for the fifth gear and located in a stationary position while waiting next command signals from the controller (not shown) of the vehicle. In this stage, "clutch A" of the dual clutch transmission (which is assigned to drive the odd numbered gears) is applied while "clutch B" released, and the vehicle is driving with the fifth gear 45.

As illustrated in FIG. 14, when the controller delivers a command for pre-selecting the fourth gear 44 in order to prepare a down-shifting to the lower gear, the gear selector motor 412 and the gear shift motor 411 actuate the shift finger 416 to move it along the shift path 433 (FIG. 14(a)), and move the sleeve 49a to engage with the fourth gear 44 (FIG. 14(c)). Here, the vehicle is still driving with the fifth gear 45 since the clutch A (for odd number gears) is still applied, with clutch B (for even number gears) released. This is a "pre-selection" of fourth gear.

Now, when the controller delivers a gear shifting command to drive with the fourth gear in accordance with the control of automatic controller (or alternatively upon manual shift operation by the driver), the gear selector motor 412 and the gear shift motor 411 actuate the shift finger 416 to move it along the shift path 434 (FIG. 15(a)), and move the sleeve 49b and release it from the fifth gear 45 (FIG. 15(c)). Then, the clutch A (for odd number gears) is released, and clutch B (for even number gears) is applied instantaneously (e.g., in a fraction of a second), and the vehicle is changed to drive with the fourth gear 44.

The above described operations are explained in association with down-shifting between the fifth and fourth gears. However, it is noted that the down-shifting operations for other gears (e.g., between $6^{th}$ and $5^{th}$ gears, $4^{th}$ and $3^{rd}$ gears, $3^{rd}$ and $2^{nd}$ gears, $2^{nd}$ and $1^{St}$ gears, etc.) can be performed in the same or similar manner as described above.

As described above, the gear shifting devices of the invention and methods for shifting gear ratios in a transmission are illustrated and described above with several exemplary or currently preferred embodiments thereof, in particular, in connection with a dual clutch transmission of a vehicle. However, the present invention is not limited thereto, and is also applicable to other types of transmissions, for example, such as automatic transmissions and manual transmissions with or without modifications to the structures and operating methods described above.

The above disclosed embodiments of the invention are representatives of a presently preferred form of the invention, but are intended to be illustrative rather than definitive thereof. Accordingly, those skilled in the art will appreciate or recognize that various modifications and substitutions can be made thereto without departing from the spirit and scope of the present invention as set forth in the appended claims.

What is claimed is:

1. A method of shifting gears with a gear shifting device includes:

providing a gear shifting device, which includes: at least one guide rail each extending in a longitudinal axis thereof; four shift effecting members for shifting gears, the shift effecting members each having a terminal end portion with a finger receiving opening formed therein; and a shift shaft extending in a direction generally parallel to the longitudinal axis of the guide rail, the shift shaft having a shift finger coupled thereto, wherein the terminal end portions of the four shift effecting members are disposed in an angularly arranged pattern, and wherein the finger receiving openings of two inner terminal end portions have an opening width which is larger than that of the finger receiving openings of two outer terminal end portions;

rotating the shift shaft and pivotally positioning the shift finger at a location aligned to receive in the finger receiving opening of a selected one among the shift effecting members; and displacing the shift shaft in the longitudinal direction and moving the selected shift effecting member to effect a gear shifting operation.

2. The method of claim 1, wherein the gear shifting device includes two electric motors with their rotating shafts in parallel alignment with the longitudinal axis of the guide rail, wherein said rotating the rotation of the shift shaft is performed by one of the two electric motors, and said displacing the shift shaft in the longitudinal direction is performed by the other one of the two electric motors.

3. The method of claim 1, wherein the gear shifting device is coupled with a dual clutch transmission containing two clutches, one for driving the odd numbered gears and the other for the even numbered gears, and wherein the at least one guide rail includes first and second guide rails disposed in parallel with each other, and said shift effecting members include four shift forks, two slidably coupled to the first guide rail and two slidably coupled to the second guide rail, in which each of the four shift forks is assigned to effect one or two gears with nonconsecutive gear numbers.

4. The method of claim 3, wherein, among the four shift forks, the first shift fork is for he first and third gears, the second shift fork for second and fourth gears, the third shift fork for a fifth gear, and the fourth shift fork for sixth and reverse gears.

5. The method of claim 3, wherein the dual clutch transmission is coupled with two input shafts of the transmission to drive an output shaft, and allows a pre-selection of one gear while the transmission is driving with another gear engaged.

* * * * *